June 17, 1958 D. E. ANDERSON 2,838,841
GAUGE ASSEMBLY
Filed March 23, 1955 3 Sheets-Sheet 1
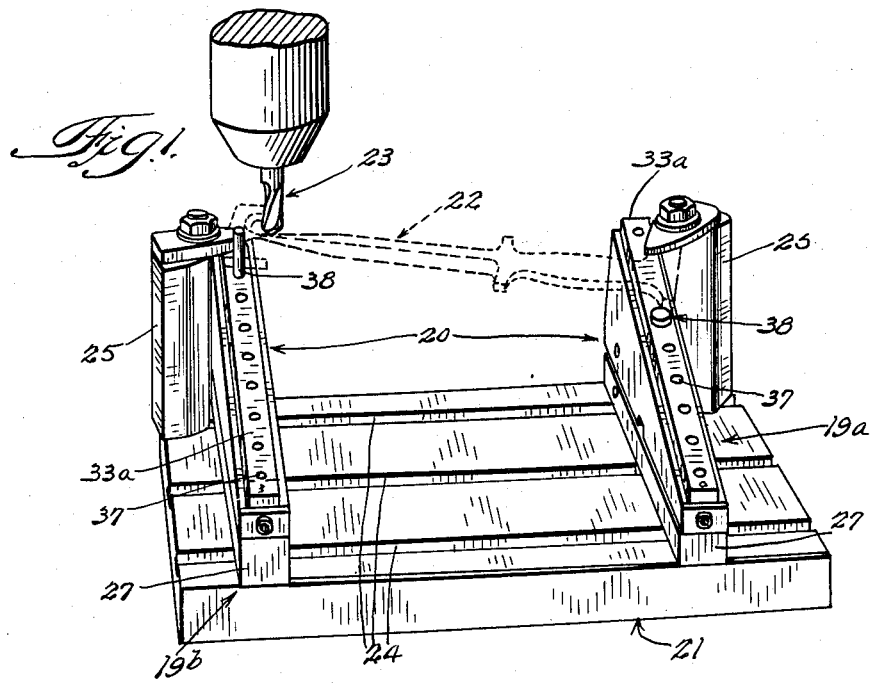
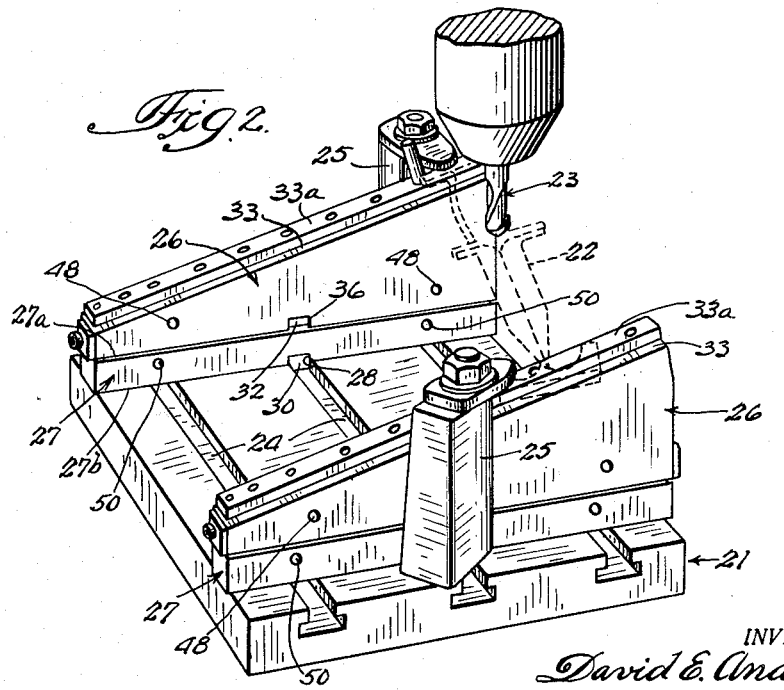
INVENTOR.
David E. Anderson
BY

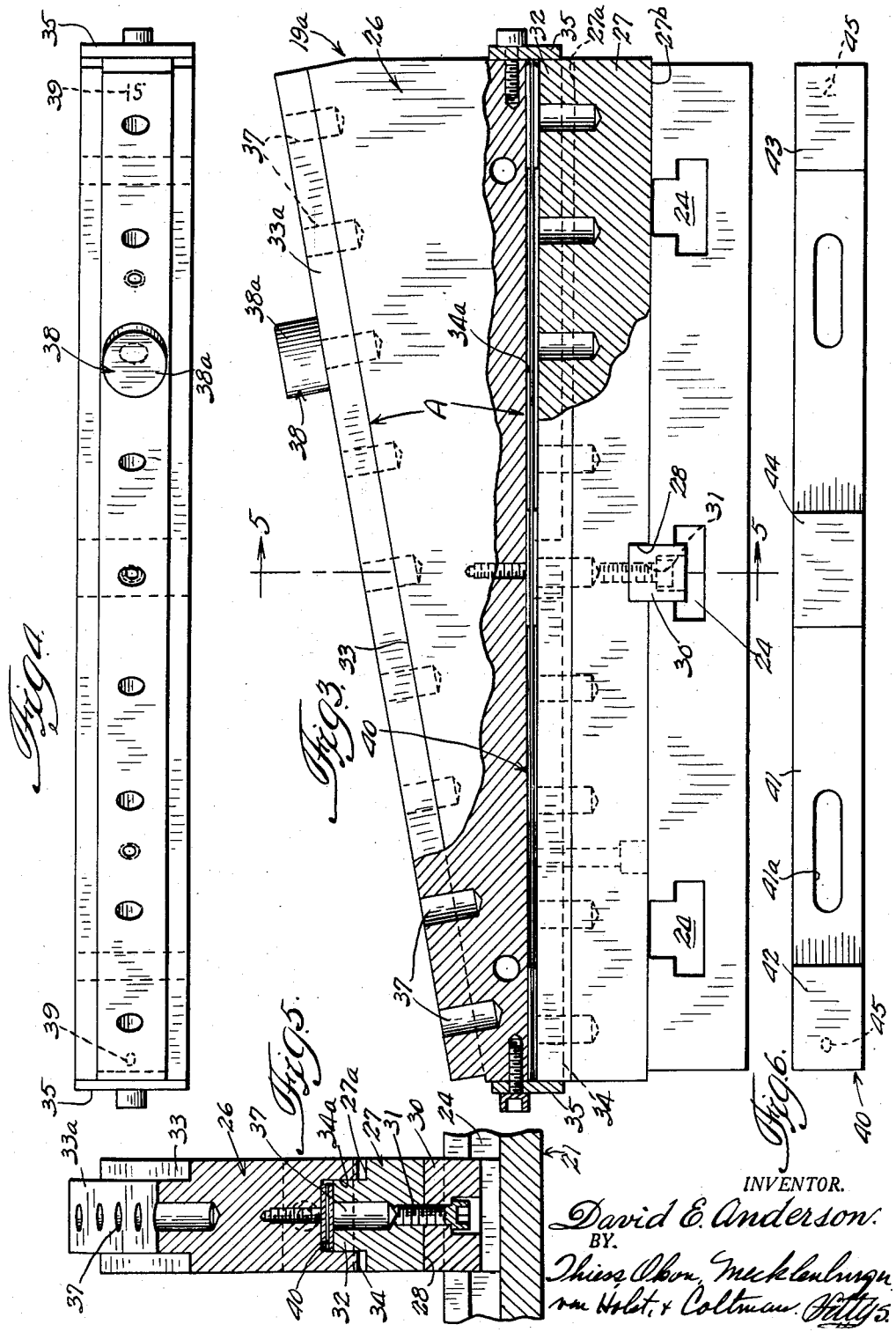

June 17, 1958     D. E. ANDERSON     2,838,841
GAUGE ASSEMBLY
Filed March 23, 1955     3 Sheets-Sheet 3
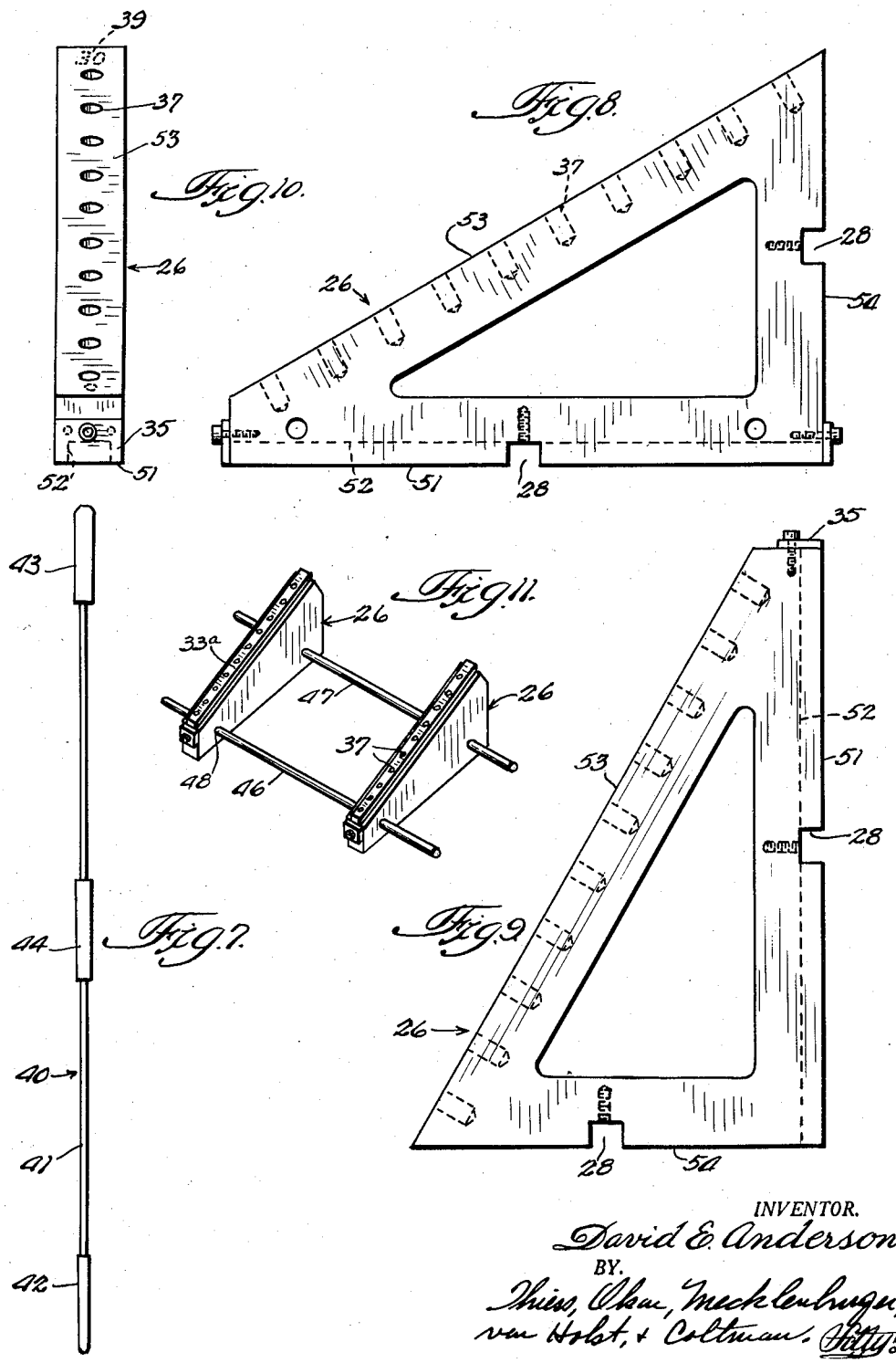
INVENTOR.
David E. Anderson
BY
Thiess, Olson, Mecklenburger,
van Holst, & Coltman United States Patent Office 2,838,841
Patented June 17, 1958

2,838,841
GAUGE ASSEMBLY

David E. Anderson, Chicago, Ill.

Application March 23, 1955, Serial No. 496,152

3 Claims. (Cl. 33—174)

This invention relates to a gauge assembly for use in accurately positioning one plane at a predetermined angle with respect to a second plane.

In machining operations, for example, it is oftentimes necessary for a machinist to accurately duplicate various angular positions of the work being fabricated with respect to the base plane of the bed or table of the machine. Heretofore to accurately duplicate such angular positions required the talents of a skilled machinist, particularly where the inclination of the work-supporting plane was to be accurate to within a fraction of a degree. Various gauge assemblies for accomplishing this operation have heretofore been proposed, however, because of their particular designs, they were difficult and awkward to assemble, could not properly be retained in assembled relation so as to effectively support the work at a desired angle while it was being fabricated, were expensive and bulky in construction, were of questionable accuracy, and required the skill of a highly trained operator.

Thus, it is one of the objects of this invention to provide a gauge assembly which permits accurate positioning of one plane with respect to another in a facile manner and without requiring the efforts of a highly skilled person.

It is a further object of this invention to provide a gauge assembly which is adapted to be used with various types of machines.

It is a still further object of this invention to provide a gauge assembly which may be readily assembled or disassembled and, when disassembled assume a compact condition suitable for carrying by the operator.

It is a still further object of this invention to provide a gauge assembly which is of rigid construction and capable of properly supporting the work in a desired position while it is being fabricated.

It is a still further object of this inveniton to provide a gauge assembly wherein the various parts thereof will properly retain a given assembled relation with respect to one another.

It is a still further object of this invention to provide a gauge assembly having a low silhouette, when in an assembled relation on a machine, and thereby not interfere with proper operation or manual manipulation of the various parts of the machine.

It is a still further object of this invention to provide a gauge assembly wherein the various parts thereof may be arranged in similar relatively spaced stacks and the spacing between such stacks limited only by the physical dimensions of the surface upon which the stacks are mounted.

Further and additional objects will appear from the description, accompanying drawings, and appended claims.

In accordance with one embodiment of this invention, a gauge assembly is provided which includes sets of blocks adapted to be arranged in predetermined stacked relation. Each set of blocks has opposite angularly disposed surfaces, the angularity of such surfaces of one set of blocks being different from that of a second set. Cooperating with the sets of blocks and adapted to be disposed intermediate the angular surfaces of the stacked sets are sets of relatively thin prismatic insert pieces. The angularity between the block-contacting sides of each set of insert pieces is different and less than the angularity of the opposite surfaces of the blocks. Each set of blocks is provided on the opposite angular surfaces thereof with complemental means which permit sets of blocks and insert pieces to be retained in a predetermined assembled relation. The exposed surfaces of the outermost set of stacked blocks define the work-supporting plane at a predetermined angular relation with respect to a reference plane.

For a more complete understanding of this invention, reference should be made to the drawings, wherein:

Figures 1 and 2 are fragmentary perspective views of the improved gauge assembly, shown mounted in a stacked relation on the bed plate or table of a milling machine and showing, in dotted lines, a workpiece supported thereby;

Fig. 3 is an enlarged fragmentary side elevational view, partially in section, of the improved gauge assembly shown mounted on the machine table;

Fig. 4 is a top plan view of Fig. 3;

Fig. 5 is a sectional view taken along line 5—5 of Fig. 3;

Figs. 6 and 7 are enlarged top and side views, respectively, of one of the insert pieces for the improved gauge assembly;

Figs. 8 and 9 are enlarged side elevational views of one of the plurality of blocks of the improved assembly, shown in changed positions;

Fig. 10 is a left end view of Fig. 8; and

Fig. 11 is a reduced perspective view of the gauge assembly shown assembled for use on a layout table.

Referring now to the drawings and more particularly to Figs. 1 and 2, an improved gauge assembly 20 is shown, in this instance, mounted on the bed plate or table 21 of a conventional milling machine or the like. The assembly is shown arranged in two relatively spaced stacks 19a and 19b which support a workpiece 22 at a predetermined angle with respect to the upper or exposed surface of the table 21 and the cutter 23, the latter also forming a part of the machine.

The table 21, in this instance, has a planar substantially horizontal surface in which are formed a plurality of elongated substantially parallel crosswise extending grooves 24. Mounted on the table 21 adjacent each stack 19a and 19b of the assembled parts of the gauge assembly and cooperating therewith are clamps 25 which are adapted to hold the workpiece 22 firmly in position on the inclined surface of the assembly 20. The spacing between the stacks 19a and 19b of the assembly when the latter is mounted on the table 21 will be governed by the size of the workpiece to be fabricated and the physical dimensions of the table.

The form of assembly 20, as shown in Figs. 1 and 2, comprises a first set of blocks 26 which are assembled with a set of base units 27 to form a pair of relatively spaced upwardly extending stacks 19a and 19b. The silhouette of the stacks is relatively low thereby providing adequate clearance between the cutter 23 and the exposed top surface of each stack so as to permit the operator to readily position the workpiece on the assembly and manipulate the cutter. The base units 27, in this instance, are of solid construction and of rectangular configuration having the upper and lower sides thereof, 27a and 27b, respectively, disposed in substantially parallel relation with respect to one another. The vertical planes formed by the stacks 19a and 19b are substantially parallel and perpendicular to the upper surface of table 21, which will hereinafter be called the reference plane. Formed in the underside 27b of each base unit 27 is a centrally located crosswise extending slot 28 in which is adapted to be positioned a lug 30, the latter being adapted to fit within one of the grooves 24 formed in the table 21 and prevent relative movement of the stacks 19a and 19b with respect to table 21 except longitudinally of grooves 24. The lug 30 is secured to the underside 27b by a screw or bolt 31. The upper or opposite side 27a of base unit 27 is provided with an elongated centrally disposed ridge or raised portion 32 which, to be hereinafter described, is adapted to accommodate one surface of one of the blocks 26. If desired, base units 27 may be omitted and the gauge blocks 26 mounted in direct contact with the table 21.

The set of blocks 26, as shown in Fig. 2, have the upper and lower sides thereof, 33 and 34, respectively, angularly disposed with respect to one another so that the peripheral shape of each block 26 is akin to a wedge. The angularity A between the upper and lower surfaces of each set of blocks 26 is different for a reason which will become apparent hereinafter. The upper side 33 of block 26 has a configuration similar to the upper side of unit 27—that is to say, it is provided with an elongated centrally disposed ridge or raised portion 33a of uniform cross section. The under or opposite side 34 of block 26 is provided, in turn, with an elongated centrally disposed recessed portion or well 34a which, when the blocks are assembled, is adapted to snugly accommodate the ridge portion 32 or 33a of either the base unit 27 or another block 26, respectively, when the various parts of the gauge assembly are assembled in stacked relation. Because of the uniformity of cross section of ridge portion 32 or 33a, the well 34a will accommodate such ridge portion when the unit or block is in reverse positions. Thus, once the recessed portion 34a of the block 26 accommodates such a ridge portion, the blocks or block and unit are held against accidental disengagement, or relative shifting or sliding movement. Thus, the gauge assembly, when in assembled condition, is capable of properly supporting the work-piece 22 when the latter is subjected to the cutting action of the cutter 23. What set or combination of sets of blocks 26 are to be used in supporting the workpiece at a given angle will depend upon the angle the plane of the workpiece is to be held with respect to the reference plane. The angle A, heretofore mentioned, formed between the surfaces 33 and 34 of each set of blocks 26 will vary. In one form of the improved gauge assembly, where a wide range of possible angles is desired, sets of blocks having the following values of angle A are suggested: 1, 2, 3, 4, 5, 10, 15, 20, 30, 45, and 60 degrees. In certain instances, however, where such a wide range is not required only blocks 26 having the following values of angle A are suggested: 1, 3, 8, 25, and 60 degrees. To produce a work-supporting surface which is inclined with respect to the reference plane at an angle different from that of the foregoing values of A, various sets of blocks, when assembled in stacked relation, may be turned 180° relative to one another so that the angle A of one set of blocks will add or subtract from the value of angle A of another set of blocks.

The recessed portion 34a, formed in the underside of each block 26, has the ends thereof formed by a pair of end pieces 35 which are secured to the opposite ends of the block 26 by screws or any other suitable means, thereby permitting the recessed portion 34a to completely encompass the ridge portion 32 or 33a.

The raised or ridge portion 32 or 33a of each base unit 27 or block 26, respectively, is provided with a plurality of open end pockets 37 which are spaced equidistant longitudinally along the top surface of the ridge portion and the axes of these pockets are disposed substantially perpendicular thereto. The pockets 37 are adapted to receive work-stop pieces 38 which are adapted to prevent the workpiece 22 from sliding down the desired inclined work-supporting surface defined by upper surfaces of the top set of stacked blocks or the set disposed furthest from the reference plane of table 21 on which the blocks are positioned. Each stop piece has a portion 38a thereof protruding outwardly from pocket 37 and is adapted to be contacted by the workpiece 22. The shape or diameter of portion 38a will vary within a range from between the diameter of the pocket to the distance between the center lines of the pockets. Thus, the variance in the shape of portion 38a will permit the workpiece to be held at a predetermined angle with respect to the cutter 23 within the work-supporting surface, see Figs. 1 and 2.

In Figs. 8–10, a block 26 in the form of substantially a 30–60 degree triangle is shown. In this instance, one side 51 of the triangular-shaped block 26 is provided with a recessed portion 52 similar to that described for the underside 34 of block 26, shown in Figs. 3–5. Surface 53 of block 26, which corresponds to the hypotenuse of a triangle, is substantially flat and is provided with a plurality of uniformly spaced pockets 37 for accommodating work-stop pieces 38. The short side 54 of the triangular shaped block is likewise substantially flat and is provided with a cross slot 28 which is adapted to receive a lug 30, shown in Fig. 3, when side 54 is in direct contact with the reference plane. Side 51 of the triangular-shaped block is also provided with a slot 28 for the same purpose. What position the surface 53 of the block will assume with respect to the table 21 of the machine will depend upon the inclination of the work-supporting surface desired.

In Figs. 6 and 7 is shown one of a series of insert pieces 40 which are adapted to be positioned within the recessed portions of blocks 26 to produce a desired work-supporting surface having an angularity with the reference plane which includes a fraction of a degree, for example, minutes or seconds. The pieces 40 are relatively thin and substantially prismatic in configuration. The piece, in this instance, is formed from a piece of strip material 41 having raised or enlarged end sections or footings 42 and 43, and a center section or footing 44. The opposite block-contacting surfaces of the sections 42—44 are coplanar and angularly disposed with respect to one another and are always disposed less than 1° with respect to one another. The shape of pieces 40 are such, as heretofore mentioned, that they conform to the configuration of the recessed portion 34a and are adapted to be disposed therein, as seen more clearly in Figs. 3 and 5. Body portion 41 of piece 40 may be provided with a plurality of slots 41a, if desired, for reducing the weight thereof. Furthermore, the piece 40 may be formed of a single strip of material wherein the whole of the opposite sides thereof is in contact with ridges and recessed portions of the blocks and/or units, and the center and end sections are omitted. The angularity of the opposite or block-contacting surfaces of the pieces are indicated by numerals 45 engraved at opposite ends of the piece. For example, in Fig. 6 the piece therein illustrated has an angularity of 2 minutes. A similar angle indicating numeral 39 is indicated at one end of each opposite surface 33 or 34 of block 26.

The insert pieces heretofore described may include sets thereof having an angularity of 1, 2, 3, 4, 5, 10, 15, 20, 30, and 45 minutes and in addition sets having angles of 1, 5, 15, 30, and 45 seconds. The insert pieces are all of substantially uniform size and are interchangeable with respect to one another so that depending upon how the piece or combination of pieces is arranged within a recessed portion 34a, various combinations of angles may be obtained; for example, when utilizing a piece having a 3 minute angularity in combination with a piece having a 5 second angularity, the resultant angularity utilizing both pieces might be either 2 minutes and 55 seconds or 3 minutes and 5 seconds. Likewise, in arranging the angle blocks 26 with respect to one another, various angles might be obtained such as, for example, when utilizing the 2° and 10° blocks, an angle of 8° or 12° might be obtained. It will be seen that a work-supporting plane may be disposed with respect to a reference plane at a multitude of different angles by combining various blocks 26 and insert pieces 40 in stacked relation. When the improved gauge assembly is to be used on a layout table for determining the accuracy of various angles formed on the workpiece, a pair of elongated rods 46 and 47 are adapted to be used which have the ends thereof extending through openings 48 or 50 formed in either the blocks 26 or base units 27, respectively, see Fig. 11. Thus each stack of blocks 19a and 19b will be disposed in a predetermined reference plane notwithstanding the nonplanar character of the layout table surface upon which the assembly rests.

Thus, a gauge assembly has been provided which enables an operator to readily duplicate a predetermined angular relation with respect to two planes in a simple and facile manner. Futhermore, the various blocks and insert pieces forming part of the improved assembly may be readily held in a fixed assembled relation with respect to one another and effect proper support for a workpiece when the latter is being fabricated. The gauge assembly, when assembled on a machine, will have a relatively low silhouette, thereby enabling the operator to readily manipulate the cutter or workpiece without interference.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. A gauge assembly for use in positioning a work-supporting plane in a predetermined angular relation with respect to a reference plane, said assembly comprising a plurality of interchangeable blocks adapted to be arranged in stacked relation on the reference plane, said blocks having angularly disposed opposite surfaces of substantially uniform dimensions, the angularity of said surfaces of each block being different, one angular surface of each block being provided with an elongated recessed portion and the opposite angular surface thereof being provided with an elongated protuberance adapted to be nested within the recessed portion of a second block when said blocks are assembled in stacked relation, and a plurality of relatively thin prismatic insert pieces adapted for disposition intermediate the recessed surface portion of one block and the protruding surface portion of a second block when said blocks are assembled in stacked relation, the angularity between the opposite block-contacting sides of said insert pieces being different from one another and less than the angularity of the opposite surfaces of any of said blocks, the peripheral shape of each insert piece being substantially the same as the configuration of the recessed surface portions of said blocks; the exposed angular surface of the uppermost block of the stack defining the work-supporting plane at the predetermined angle with respect to the reference plane.

2. A gauge assembly for use in positioning a work-supporting plane in a predetermined angular relation with respect to a reference plane, said assembly comprising sets of interchangeable blocks adapted to be arranged in a plurality of relatively spaced similar stacks on the reference plane, each block of a set having angularly disposed opposite surfaces of substantially uniform dimension, the angularity of said surfaces of each set of blocks being different, one angular surface of each block being provided with an elongated recessed portion and the opposite surface thereof being provided with an elongated protruding portion adapted to be positioned within the recessed portion of a block of a second set to effect retention of said sets in assembled stacked relation, the protruding surface portion of each block being provided with a plurality of uniformly spaced pockets arranged longitudinally of said surface portion, sets of relatively thin interchangeable prismatic insert pieces for disposition intermediate the recessed surface portions of the blocks of one set and the protruding surface portions of the blocks of a second set, when said sets of blocks are assembled in stacked relation, the angularity of the block-contacting sides of each set of insert pieces being different and less than the angularity of the opposite surfaces of said blocks, and sets of work-stop means positionable within said surface pockets and having portions thereof projecting substantially normal from the exposed protruding surface portions of the uppermost set of stacked blocks, the projecting portions of each set of work-stop means having a different peripheral dimension, the exposed protruding surface portions of the uppermost set of stacked blocks defining the work-supporting plane at the predetermined angular relation with respect to the reference plane.

3. A gauge assembly as in claim 1, and wherein said blocks are provided with stop means to prevent longitudinal displacement of one block with respect to the next adjacent block in stacked relation.

References Cited in the file of this patent

UNITED STATES PATENTS

| 1,826,802 | Lovenstow | Oct. 13, 1931 |
| 2,075,008 | Damm | Mar. 30, 1937 |
| 2,134,062 | Trojevich | Oct. 25, 1938 |
| 2,599,500 | Tinker | June 3, 1952 |
| 2,609,612 | Mull | Sept. 9, 1952 |
| 2,676,413 | Wharton | Apr. 27, 1954 |

FOREIGN PATENTS

| 928,649 | France | Dec. 3, 1947 |